No. 838,958. PATENTED DEC. 18, 1906.
M. E. DE GREE & D. C. McALISTER.
BELT GUIDE.
APPLICATION FILED FEB. 10, 1906.
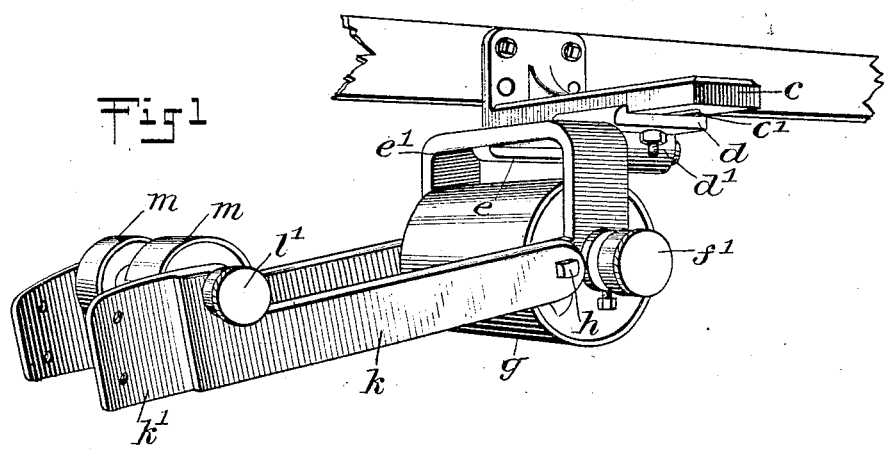
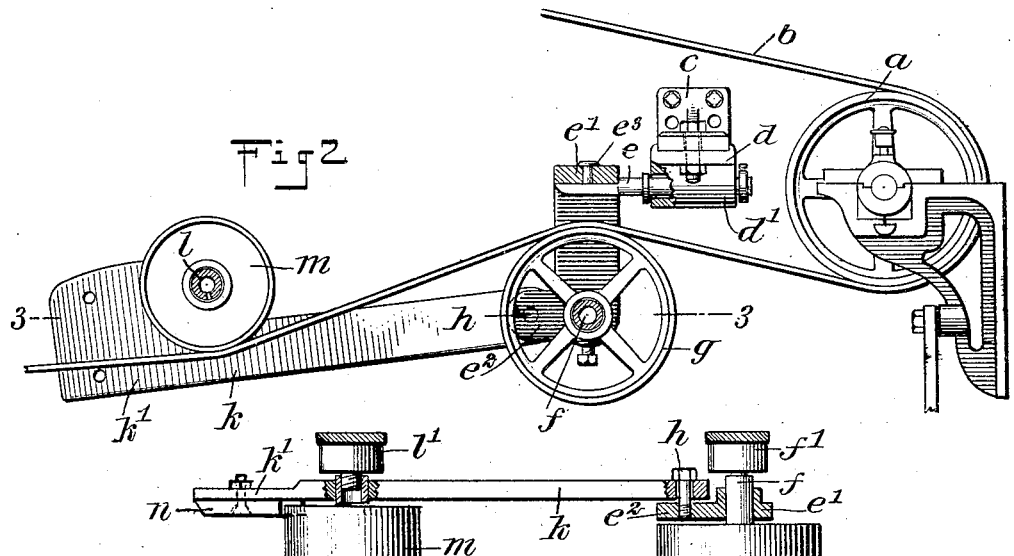
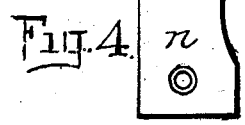
WITNESSES:
John J. Kuttle
A. E. Fay
INVENTORS
Moses E. De Gree
Donald C. McAlister
BY Munn & Co
ATTORNEYS

UNITED STATES PATENT OFFICE.

MOSES EDWIN DE GREE AND DONALD C. McALISTER, OF FLAXTON, NORTH DAKOTA.

BELT-GUIDE.

No. 838,958.

Specification of Letters Patent.

Patented Dec. 18, 1906.

Application filed February 10, 1906. Serial No. 300,458.

*To all whom it may concern:*

Be it known that we, MOSES EDWIN DE GREE and DONALD C. McALISTER, citizens of the United States, and residents of Flaxton, in the county of Ward and State of North Dakota, have invented a new and Improved Belt-Guide, of which the following is a full, clear, and exact description.

The principal objects of our invention are to so construct a belt-guide as to prevent all wabbling and vibration on the part of the belt and guide itself; also, to simplify the construction and provide a convenient device which will take up little room and be capable of construction at a small cost and readily repaired when injured in any manner.

Reference is to be had to the accompanying drawings, forming a part of this specification, in which similar characters of reference indicate corresponding parts in all the figures.

Figure 1 is a perspective view of a belt-guide, showing the principle of our invention. Fig. 2 is a sectional view of the same on the line 2 2 of Fig. 3. Fig. 3 is a sectional view of the same on the line 3 3 of Fig. 2, and Fig. 4 is a side view of one of the guide-plates.

The pulley to which the belt is to be guided is indicated by the letter $a$, and the belt by the letter $b$. Upon a stationary element, usually a portion of the machine upon which the pulley $a$ is located, we provide a bracket $c$, having a slot $c'$. On the under side of this bracket is mounted a plate $d$, which is adjustable longitudinally on the bracket, a bolt passing through the plate and a slot $c'$ in the bracket $c$. The plate $d$ is provided with a bearing $d'$, carrying a stud $e$, upon which is pivotally mounted a hanger $e'$ by means of a rivet or bolt $e^3$. This construction allows the hanger to turn to keep the parts in alinement when the driving and driven pulleys are out of line. Journaled in this hanger is a hollow shaft $f$, provided with headed screws $f'$ at its ends. On this shaft is mounted a pulley $g$, over which the belt $b$ runs, and on the hanger is a projection $e^2$, to which is pivoted, by means of stud-bolts $h$, a frame $k$. This frame is provided with a hollow shaft $l$, which also has headed screws $l'$ at its ends to hold it in position on the frame $k$, and it carries a pair of small pulleys $m$, under which the belt $b$ runs. The outer end of the frame $k$ is provided with a pair of inwardly-projecting jaws $k'$, which serve as guides for the belt. When a narrower belt is used, guide-plates $n$ are employed, the plates being removably secured to the inner faces of the jaws by bolts, as shown in Fig. 3. While we have shown but one set of plates, it is to be understood that two or more sets of these plates are to be provided, so that any change in the width of the belt can be accommodated by changing the plates. When the device is in use, the belt pulls the frame $k$ up into the position shown, and when not in use this portion of the device can hang down, where it will be out of the way.

A device constructed in accordance with the principles herein set forth, whether in the exact form or not, is much steadier in use than those which have heretofore been constructed, so far as we are aware, and does away with the vibration and wabbling commonly experienced in the use of articles of this kind.

Having thus described our invention, we claim—

1. A belt-guide comprising a support, a plate adjustably mounted thereon, a hanger pivotally connected with the plate, a pulley mounted in the hanger, a frame pivotally connected with the hanger, and a pulley mounted in the frame.

2. A belt-guide comprising a hanger mounted to rock and to swing in a horizontal plane, a pulley mounted in said hanger, a frame pivotally mounted on said hanger to swing in a vertical plane, and a guide-pulley mounted in the frame.

3. A belt-guide comprising a pivotally-mounted hanger, a pulley journaled thereon, a frame pivotally mounted on the hanger, a shaft in said frame, a pair of pulleys on said shaft, and removable plates mounted on the inside of said frame adjacent to the outer side of said pair of pulleys.

4. A belt-guide comprising a plate, a horizontal spindle mounted on the plate, a hanger pivoted on a vertical pivot to the spindle, a pulley mounted in the hanger, a frame pivoted to the hanger on horizontal pivots, and a guide-pulley mounted in the frame.

5. A belt-guide comprising a support, a horizontal spindle mounted in the support, a hanger carried by the spindle, a pulley on the hanger journaled on a shaft at right angles to the spindle on which the hanger is journaled, a frame pivoted to the hanger on pivots parallel to the axis of said pulley, a shaft mounted in the frame parallel to said pulley, and a pair of pulleys on the shaft.

6. A belt-guide comprising a pivoted frame, guide-pulleys on the frame, and a pair of removable plates on the opposite inside surfaces of the frame for guiding the belt to the pulleys on the frame.

In testimony whereof we have signed our names to this specification in the presence of two subscribing witnesses.

MOSES EDWIN DE GREE.
DONALD C. McALISTER.

Witnesses:
WILFRED E. BURGETT,
BERTIE NELSON.